(12) United States Patent
Setescak

(10) Patent No.: US 6,557,409 B2
(45) Date of Patent: May 6, 2003

(54) MASS FLOWMETER

(75) Inventor: Stephen Setescak, Pentling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/874,778

(22) Filed: Jun. 5, 2001

(65) Prior Publication Data

US 2001/0052263 A1 Dec. 20, 2001

(30) Foreign Application Priority Data

Jun. 5, 2000 (DE) .......................... 100 27 831

(51) Int. Cl.⁷ ................................. G01F 1/68
(52) U.S. Cl. ................................. 73/204.21
(58) Field of Search ................ 73/204.22, 204.21, 73/202.5, 118.2; 138/37, 39; 123/494; 137/550; 210/489, 496, 497.2

(56) References Cited

U.S. PATENT DOCUMENTS

| | | | |
|---|---|---|---|
| 4,416,676 A | * 11/1983 | Montierth | 210/510.1 X |
| 4,420,316 A | * 12/1983 | Frost et al. | 210/510.1 X |
| 4,814,081 A | * 3/1989 | Malinowski | 210/489 |
| 4,841,938 A | * 6/1989 | Weibler et al. | 73/118.2 X |
| 5,253,517 A | 10/1993 | Molin et al. | |
| 6,189,380 B1 | * 2/2001 | Yamakawa et al. | 73/204.21 |
| 6,240,775 B1 | * 6/2001 | Uramachi et al. | 73/204.21 |

FOREIGN PATENT DOCUMENTS

EP      0458998 A1     12/1991

\* cited by examiner

*Primary Examiner*—Hezron Williams
*Assistant Examiner*—Charlene Dickens
(74) *Attorney, Agent, or Firm*—Laurence A. Greenberg; Werner H. Stemer; Ralph E. Locher

(57) ABSTRACT

A mass flowmeter includes a flow straightener or rectifier having a honeycomb member. The honeycomb member has at least one honeycomb, which is aligned with a sensor element in a flow direction. Two walls of that honeycomb enclose an angle. The sensor element is positioned with reference to a bisector axis of the angle enclosed by the two honeycomb walls in such a way that a mass flow thereto corresponds approximately to a mean value of a wave-shaped air flow in direction of the bisector axis when the flow is about to change over from laminar to turbulent flow.

5 Claims, 4 Drawing Sheets

MASS FLOWMETER

BACKGROUND OF THE INVENTION

Field of the Invention

The invention relates to a mass flowmeter, in particular for detecting an air mass flow in an intake duct of an internal combustion engine.

European Patent Application 0 458 998 A1, corresponding to U.S. Pat. No. 5,253,517, discloses a mass flowmeter having a housing in which a flow channel is constructed, and in which a flow straightener or rectifier is inserted upstream of a sensor element. The flow straightener or rectifier includes a honeycomb member and a ring which projects over the honeycomb in the flow direction and in which a grille that generates micro-eddies is embedded at a spacing from the honeycombs. The grille smooths the flow along the entire cross section of the flow straightener or rectifier. That ensures that the flow in the region of the sensor element is well conditioned, and a sensor signal which is generated by the sensor element precisely and accurately represents the air mass flow in the flow channel. However, the small-mesh grille has the disadvantage of causing a pressure loss, and thus leading to worsening of the efficiency of an internal combustion engine in the intake duct of which the mass flowmeter can be disposed. Furthermore, the grille can also be easily contaminated by particles present in the air flow, that can stick in the grille and thus lead to disturbances in the flow which then in turn entail a falsification of the sensor signal.

The grille further has the disadvantage of experiencing fatigue in the case of a lengthy operating period of the mass flowmeter accompanied by high vibrational loads such as frequently occur in the field of motor vehicle engineering, and can fail mechanically. Moreover, the insertion of the grille into the ring of the honeycomb body is complicated, and therefore expensive.

SUMMARY OF THE INVENTION

It is accordingly an object of the invention to provide a mass flowmeter, which overcomes the hereinafore-mentioned disadvantages of the heretofore-known devices of this general type in such a way that firstly, it is easy to produce and secondly, it generates a precise sensor signal over an entire measuring range, with pressure loss in a flow channel being minimized.

With the foregoing and other objects in view there is provided, in accordance with the invention, a mass flowmeter, comprising a sensor element and a flow straightener or rectifier including a honeycomb member having at least one honeycomb aligned with the sensor element in a flow direction. The honeycomb member includes two honeycomb walls enclosing an angle having a bisector axis. The sensor element is positioned relative to the bisector axis to cause a mass flow to correspond approximately to a mean value of a wave-shaped air flow in direction of the bisector axis when the flow is about to change over from laminar to turbulent flow.

In accordance with another feature of the invention, the angle enclosed by the two honeycomb walls is smaller than 90 degrees and, in particular, is between 20 and 60 degrees.

In accordance with a further feature of the invention, the angle is a function of a positional tolerance of the sensor element with reference to the bisector axis, and of a prescribed maximum discontinuity in a sensor signal of the sensor element upon transition of the flow from laminar to turbulent.

In accordance with a concomitant feature of the invention, the at least one honeycomb is rhomboidal and includes two further honeycomb walls enclosing an obtuse angle.

The invention proceeds from the surprising finding that only shortly before the changeover from laminar to turbulent flow, which is a function of the mass flow and further parameters, the flow along a chord of the circular cross section of the flow channel has a wave-shaped course about the mean value of the sensor signal of the air mass flow. The amplitude of the wave-shaped oscillation can be over 50% of the mean value in this case. The sensor element is positioned with reference to the bisector axis of an angle enclosed by two honeycomb walls in such a way that the air mass flow there corresponds approximately to the mean value of the wave-shaped air flow in the direction of the bisector axis when the flow is about to change over from laminar to turbulent flow. Thus, it is ensured in a simple way that the sensor signal does not cause any discontinuity upon changeover of the flow from laminar to turbulent. Such a discontinuity would entail a large measuring inaccuracy.

Other features which are considered as characteristic for the invention are set forth in the appended claims.

Although the invention is illustrated and described herein as embodied in a mass flowmeter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
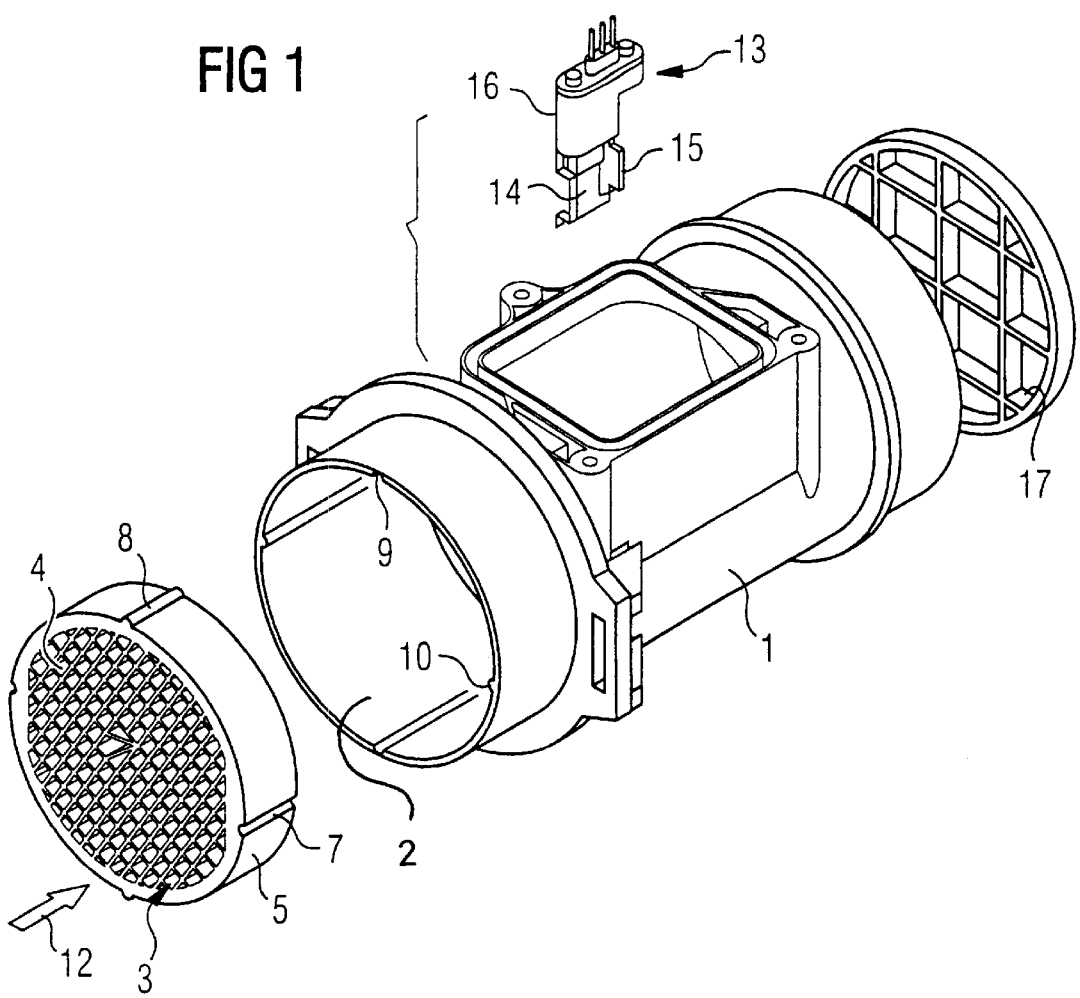
FIG. 1 is a diagrammatic, exploded, perspective view of a mass flowmeter.

Referring now in detail to the figures of the drawings, in which elements having the same structure or function have the same reference symbols, and first, particularly, to FIG. 1 thereof, there is seen a mass flowmeter which is suitable for detecting an air mass flow in an intake duct of a non-illustrated internal combustion engine. However, the mass flowmeter is also suitable for detecting any desired mass flow. The mass flowmeter includes a housing 1 in which a flow channel 2 is constructed. Furthermore, a flow straightener or rectifier 3 which includes a honeycomb member 4 and a ring 5 is inserted into the housing. The flow straightener or rectifier 3 is preferably constructed from plastic which is suitable for injection molding, and which meets thermal requirements for an intake duct of an internal combustion engine. It is preferred to use polybutylene terephthalate (PBTP) for this purpose. The individual honeycombs have, for example, an inside or clear width of four mm and straighten the flow. The flow is then approximately laminar downstream of the honeycomb member below a rate of flow which depends on various parameters, and is turbulent above this rate of flow. The flow straightener or rectifier has grooves 7 and webs 8 on its ring 5, and is inserted in an assembled state into the housing 1 of the mass flowmeter, which has corresponding mating contours, that is to say grooves 9 and webs 10.

The direction of the air mass flow is indicated by reference numeral 12.

The mass flowmeter also includes a sensor 13, which projects into the flow channel formed by the housing 1. The sensor includes a holder 14 on which a sensor element 15 is fitted. The sensor element is preferably constructed as a hot-film resistor and operates according to the principle of the hot-film anemometer. The sensor element typically has a rectangular shape, with an end surface opposing the flow direction having a substantially greater extent with reference to a first axis than with reference to a second axis. The positioning of the sensor element with reference to the first axis can be performed very precisely, that is to say with low tolerance, when the mass flowmeter is being produced.

The sensor 13 also includes a signal-conditioning part 16 in which an electronic unit is disposed for conditioning a sensor signal generated by the sensor element 15, and which includes a plug part.

A protective grid 17, which is inserted at a downstream end of the flow channel 2 formed by the housing, is intended to protect the mass flowmeter against mechanical effects, for in example against direct contact by hand. It is produced with such a wide mesh that it does not noticeably influence either the measuring accuracy of the sensor element 15 or the air mass flow.

Figure 2:
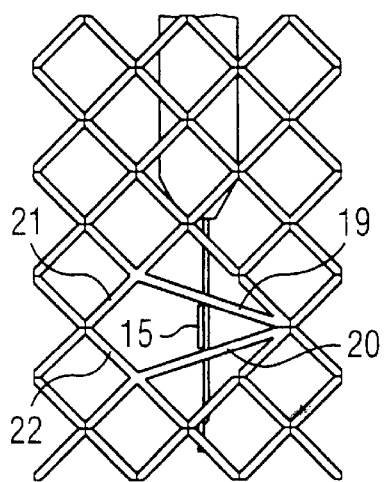
FIG. 2 is a fragmentary view of a honeycomb member and of a sensor.

FIG. 2 shows a portion of the honeycomb member 4 in a view looking onto the honeycomb member along the flow direction 12. The sensor 13 with the sensor element 15 is illustrated in the background. The honeycombs of the honeycomb member generally have a rectangular, in particular square cross section, with a cross sectional width which is 4 mm, for example.

A honeycomb with which the sensor element is aligned with reference to the flow direction has a first wall 19, a second wall 20, a third wall 21 and a fourth wall 22. The sensor element is positioned with reference to this honeycomb, in relation to a bisector axis having an angle α enclosed by the two honeycomb walls 19, 20. The positioning is carried out in such a way that the air mass flow corresponds there approximately to a mean value of a wave-shaped air flow along the bisector axis, when the flow is about to change over from laminar to turbulent flow. The honeycomb, which is formed by the first to fourth walls 19 to 22, has a rhomboidal construction.

Figure 3:
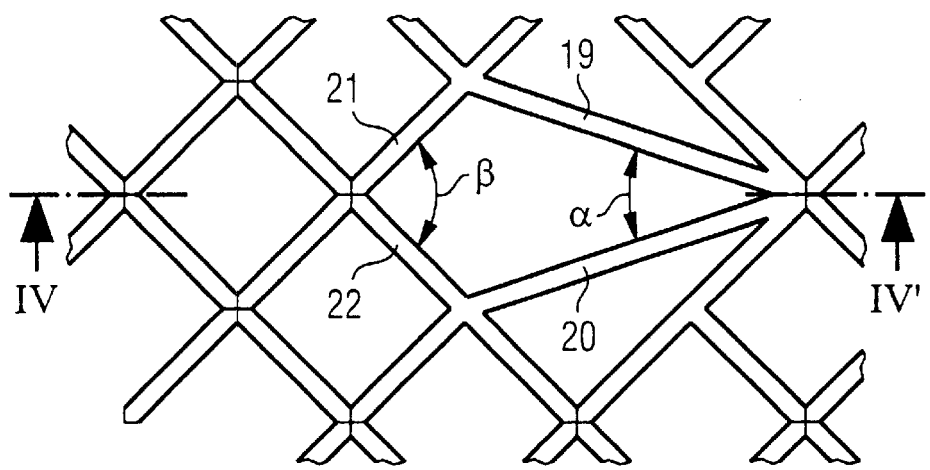
FIG. 3 is an enlarged, fragmentary view of the honeycomb member.
Figure 4:
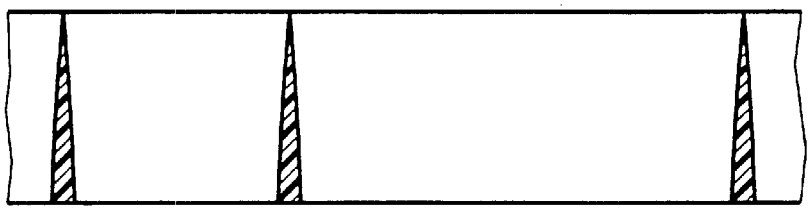
FIG. 4 is a fragmentary, sectional view of the honeycomb member, which is taken along a line IV, IV' of FIG. 3, in the direction of the arrows.
Figure 5:
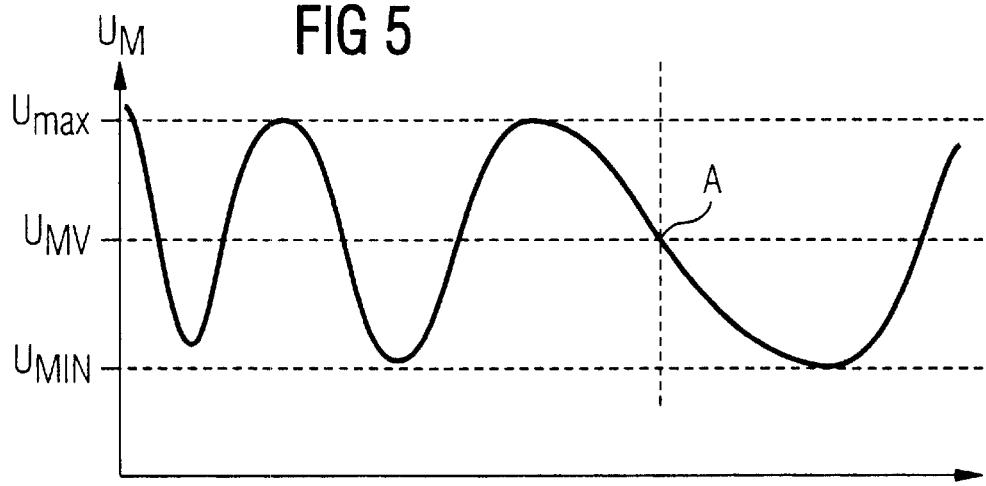
FIG. 5 is a graph showing a characteristic of a sensor signal UM, corresponding to a flow along the section line IV, IV', of a sensor element.
Figure 6:
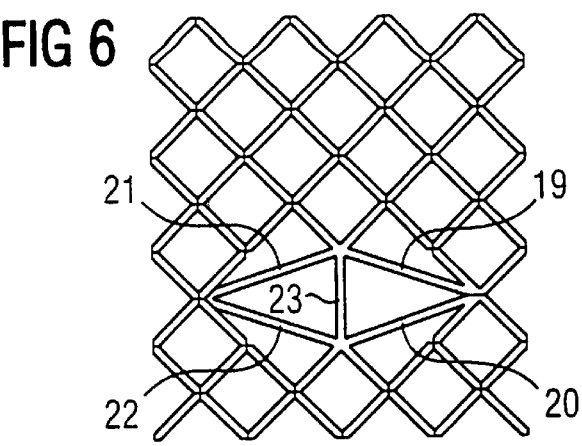
FIG. 6 is a fragmentary view of a honeycomb member in accordance with a second exemplary embodiment.
Figure 7:
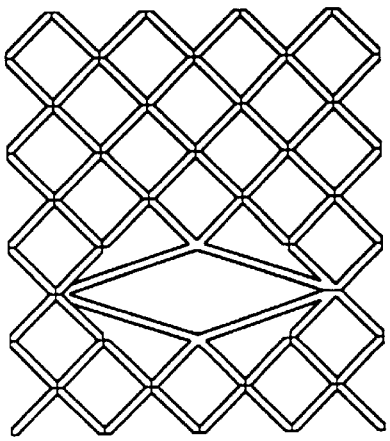
FIG. 7 is a fragmentary view of a honeycomb member in accordance with a third exemplary embodiment.

FIG. 3 shows a portion of the honeycomb member which is enlarged in comparison with FIG. 2. FIG. 4 shows a section through the honeycomb member taken along a line IV–IV' of FIG. 3. FIG. 5 shows a characteristic of the sensor signal of the sensor element 15 as a function of the positioning of the sensor element 15 along the section line IV–IV' for a flow rate shortly before the changeover from laminar flow to turbulent flow. This changeover takes place as a function of various parameters, for example at a rate of the air mass flow of approximately 2 meters per second. It is very difficult to determine the air temperature, depositions of particles on the honeycomb walls or their leading surfaces, since it depends on the air mass flow and on further parameters.

The flow downstream of the flow straightener or rectifier 3 is laminar with reference to the flow channel 2 formed by the housing 1 in a wide range of the flow rate below the changeover point. The characteristic of the sensor element can be determined very precisely in this range. This characteristic constitutes the relationship between a signal $U_M$ of the sensor and the actual air mass flow.

Measurements have surprisingly shown that the sensor signal, and thus the flow along the section line IV–IV', have a very wavy characteristic in the region of the changeover in the flow from laminar flow to turbulent flow. The sensor signal of the sensor element 13 oscillates in this case about a mean value $U_{MV}$ of the sensor signal $U_M$ with an amplitude of up to 50% of the mean value $U_{MV}$. After the changeover of the flow to turbulent flow, the mass flow along the entire line IV–IV' then suddenly corresponds to a mean value $U_{MV}$ of the flow which then likewise increases in accordance with the characteristic of the sensor element with increasing air mass flow. The section line IV–IV' coincides with the bisector of the angle α.

The sensor element 15 has an extent which is greater by orders of magnitude in the vertical direction relative to the bisector of the angle α than in the direction of the bisector. The extent in the vertical direction with reference to the bisector is approximately at least as great in this case as the cross section of a honeycomb. Therefore, with reference to the axis, the sensor signal corresponds approximately to the mean value $U_{MV}$ of the flow directly before the changeover point.

The sensor element 15 is positioned with reference to the bisector axis in such a way that the wave-shaped flow prevailing at a point A shortly before the changeover point corresponds approximately to the mean value $U_{MV}$ of the sensor signal. This has the decisive advantage of ensuring that no discontinuity occurs directly after the changeover of the sensor signal, since the waviness then collapses suddenly, and the mean value $U_{MV}$ of the sensor signal is detected in the entire region along the bisector. This configuration ensures in a simple way that a precise assignment between the sensor signal $U_M$ of the sensor element 15 and the assigned air mass flow is ensured over the entire measuring range of the sensor element even without exact knowledge of the changeover point, that is to say even in the region of the changeover point from laminar to turbulent flow.

It is particularly advantageous if the angle α is a function of the positional tolerance of the sensor element with reference to the bisector axis and to a prescribed maximum discontinuity of the sensor signal upon changeover of the flow from laminar to turbulent. In FIG. 3, the angle α is approximately 35° and therefore, as may be seen in FIG. 5, a substantially flatter gradient of the wave-shaped, quasisinusoidal, sensor signal characteristic results in the position A of the sensor element 15 than in the case of the remaining points of intersection of the wave-shaped sensor signal with the mean value $U_{MV}$. Since the gradient of the tangent of the wave-shaped sensor signal at the point at position A is a function of the angle $\alpha$, this angle can be selected as a function of a permitted positional tolerance of the sensor element 15 along the bisector axis, and of a prescribed maximum discontinuity in the sensor signal upon a changeover from laminar to turbulent flow, in such a way that these stipulated values can be observed.

Such stipulated values can be observed particularly effectively when the angle $\alpha$ is between 20 and 60°. The angle $\alpha$ is approximately 35° in the exemplary embodiment. The wave-shaped characteristic of the sensor signal is determined by appropriate measurements with the aid of a sensor element 15 which is displaced over the position in each case, or by appropriate simulation calculations.

The sensor element is positioned with reference to the bisector axis of the angle $\alpha$ in such a way that the air mass flow corresponds there approximately to the mean value of the wave-shaped air flow in the direction of the bisector axis when the flow is about to change over from laminar to turbulent flow. Therefore, it is possible to dispense with a fine-mesh grille for generating micro-eddies and thus a flow corresponding to the mean value, without impairing the measuring accuracy of the sensor element.

It is particularly advantageous if the honeycomb which is formed by the walls 19, 20, 21, 22 is rhomboidal, and the honeycomb walls 21 and 22 enclose an oblique angle. An oblique angle is designated as an angle which is greater than or equal to 90°. It is then possible to ensure by suitable selection of an oblique angle $\beta$, which is formed by the two honeycomb walls 21 and 22, that there is a stable flow characteristic over the entire relevant measuring range of air mass flow in the region of the sensor element 15. The angle $\beta$ should then be selected as a function of the angle $\alpha$ and the dimensions of the honeycomb walls 19 to 22, in such a way that the cross section of the honeycomb which is formed by these walls does not exceed a prescribed value at which a stable flow is no longer ensured.

FIGS. 6 to 10 show further exemplary embodiments of the honeycomb member with various types of configuration of the honeycomb, which is formed by the walls 19 to 22. In accordance with FIG. 6, the honeycomb formed by the walls 19 to 22 is a symmetrical double triangular honeycomb with a wall 23, whereas in accordance with FIG. 7 it is a rhombus.

Figure 8:
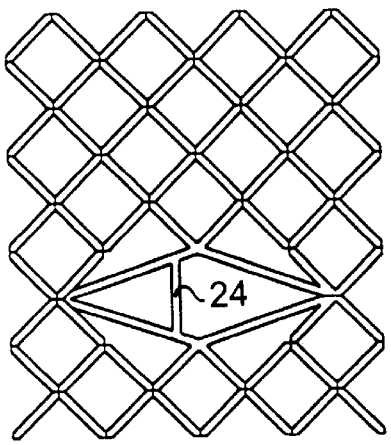
FIG. 8 is a fragmentary view of a honeycomb member in accordance with a fourth exemplary embodiment.
Figure 9:
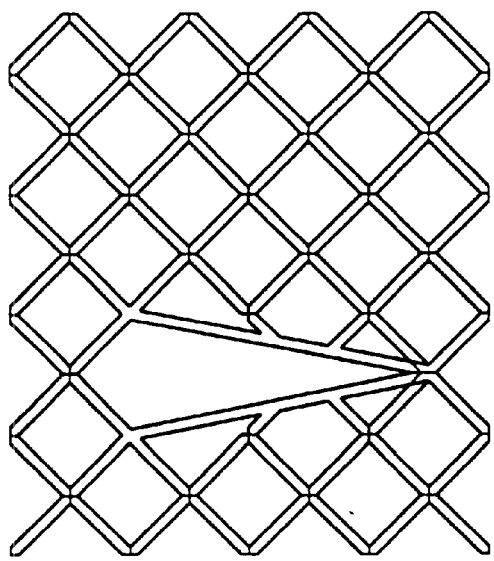
FIG. 9 is a fragmentary view of a honeycomb member in accordance with a fifth exemplary embodiment.
Figure 10:
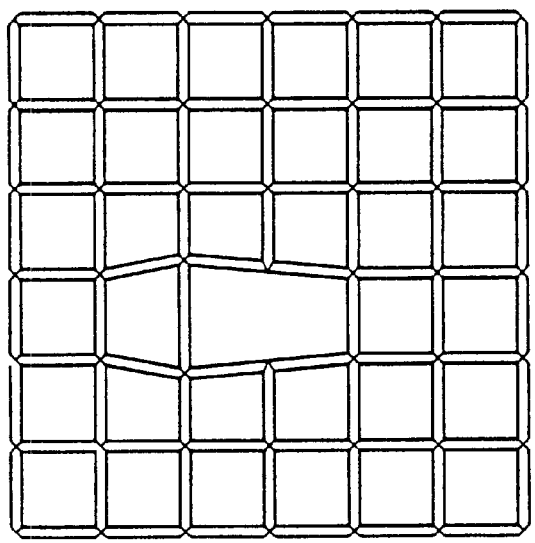
FIG. 10 is a fragmentary view of a honeycomb member in accordance with a sixth exemplary embodiment.

In accordance with FIG. 8, a honeycomb wall 24 is inserted asymmetrically into the rhombus, which is formed by the honeycomb walls 19 to 22. The flow can thereby be ensured greater stability, if appropriate. In the exemplary embodiment in accordance with FIG. 9, the honeycomb with the walls 19 to 22 extends over the cross section of a total of three regularly formed honeycombs. Alternatively, it would also be possible for more than one honeycomb, which is formed by the walls 19 to 22, to have the same geometrical shape in the honeycomb member. It is essential for the positioning of the sensor element 15 with reference to the bisector axis of the angle $\alpha$ that the flow rate is approximately identical in the region of the sensor element before and after the changeover from laminar to turbulent flow.

I claim:

1. A mass flowmeter, comprising:
   a sensor element;
   a flow rectifier including a honeycomb member having at least one honeycomb aligned with said sensor element in a flow direction, said honeycomb member including two honeycomb walls enclosing an angle having a bisector axis; and
   said sensor element positioned relative to said bisector axis to cause a mass flow to correspond approximately to a mean value of a wave-shaped air-mass flow profile in direction of said bisector axis in vicinity of said sensor element, when the flow is about to change over from laminar to turbulent flow.

2. The mass flowmeter according to claim 1, wherein said angle enclosed by said two honeycomb walls is smaller than 90 degrees.

3. The mass flowmeter according to claim 1, wherein said angle is a function of a positional tolerance of said sensor element with reference to said bisector axis, and of a prescribed maximum discontinuity in a sensor signal of said sensor element upon transition of the flow from laminar to turbulent.

4. The mass flowmeter according to claim 1, wherein said angle is between 20 and 60 degrees.

5. The mass flowmeter according to claim 1, wherein said at least one honeycomb is rhomboidal and includes two further honeycomb walls enclosing an obtuse angle.

* * * * *